J. J. SIMMONDS.
METHOD OF MAKING RETORTS OR SIMILAR DEVICES.
APPLICATION FILED FEB. 19, 1917.

1,331,285.

Patented Feb. 17, 1920.
3 SHEETS—SHEET 1.

WITNESS:
R. Hamilton

INVENTOR.
John J. Simmonds
BY Warren D. House
His ATTORNEY

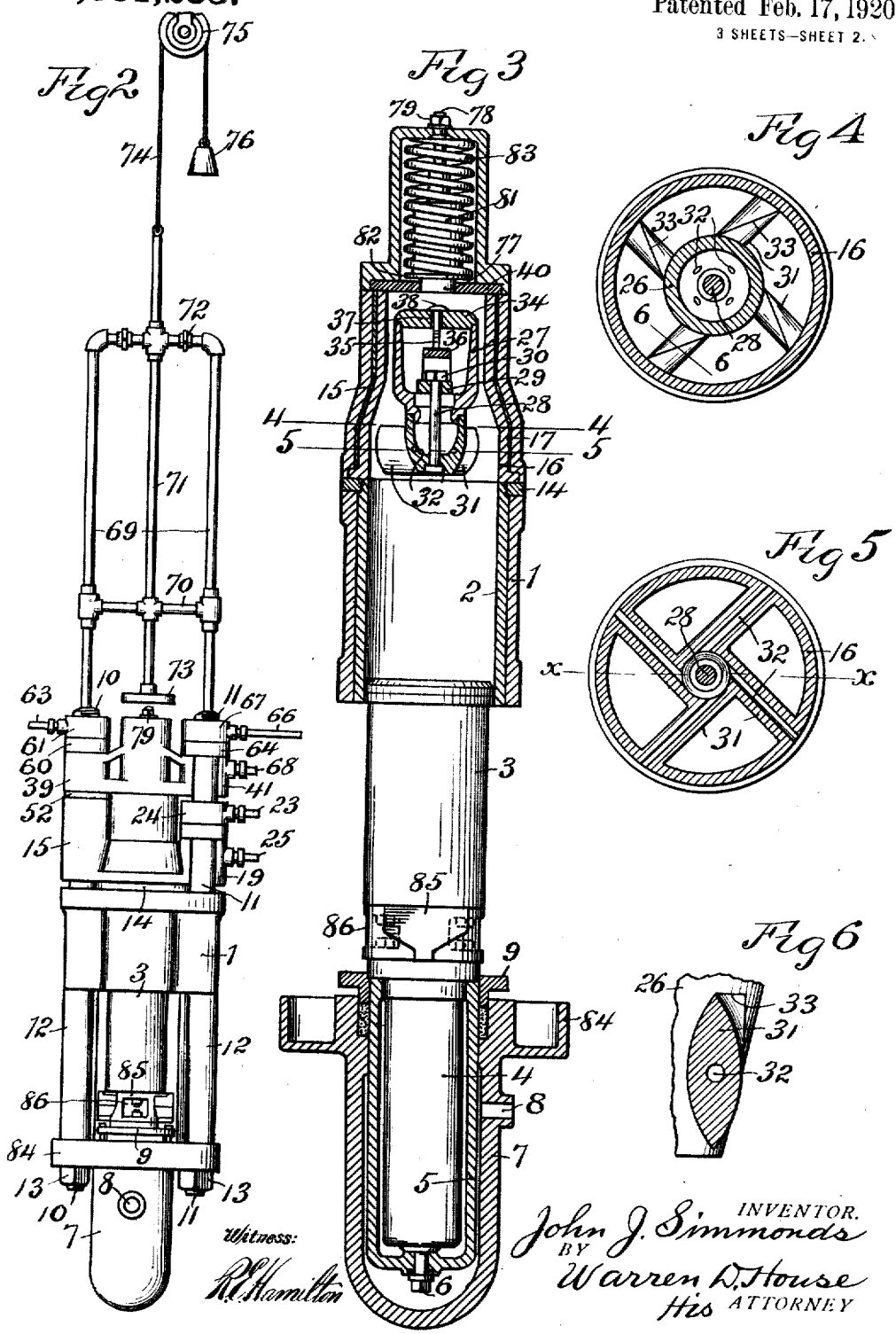

J. J. SIMMONDS.
METHOD OF MAKING RETORTS OR SIMILAR DEVICES.
APPLICATION FILED FEB. 19, 1917.
1,331,285.  Patented Feb. 17, 1920.
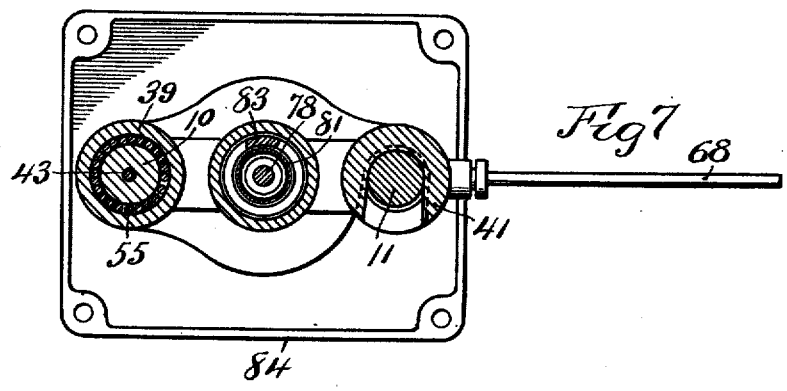
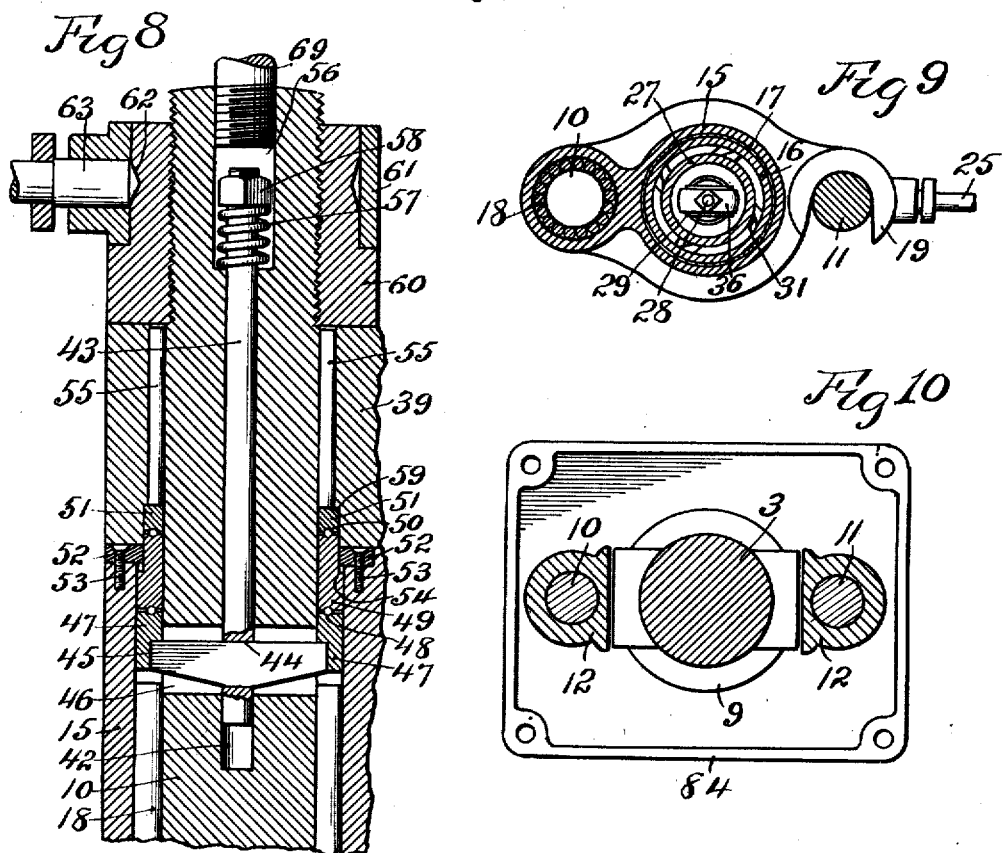

UNITED STATES PATENT OFFICE.

JOHN J. SIMMONDS, OF IOLA, KANSAS, ASSIGNOR TO THE SIMMONDS ENGINEERING COMPANY, OF IOLA, KANSAS, A CORPORATION OF KANSAS.

METHOD OF MAKING RETORTS OR SIMILAR DEVICES.

1,331,285.

Specification of Letters Patent.

Patented Feb. 17, 1920.

Application filed February 19, 1917. Serial No. 149,562.

*To all whom it may concern:*

Be it known that I, JOHN J. SIMMONDS, a citizen of the United States, residing at Iola, in the county of Allen and State of Kansas, have invented a certain new and useful Improvement in Methods of Making Retorts or Similar Devices, of which the following is a specification.

My invention relates to improvements in methods of making retorts or similar devices.

One of the objects of my invention is to provide the novel method of making a retort consisting in forming plastic retort material into a tube having a butt or closed end, and then lengthening the tube by accretions of the material applied to the other end.

Another object of my invention is to provide a method of making a retort consisting in expressing the plastic retort material through a matrix or a die having a stationary core, then forming a butt or closed end at one end of the tube formed by the die, and then lengthening the side walls of the tube by accretions of the plastic material applied to the other end thereof.

My invention provides still further the method of making a retort consisting in first forming plastic retort material into a tube having a longitudinal slot or seam, and then forcing the edges of the slot or seam together so as to make a tight joint.

My invention provides further the novel feature of overlapping and uniting the edges of the slot or seam.

My invention provides still further a method consisting in first forming plastic retort material into a tube having a longitudinal seam or slot, then closing the seam or slot, and then forming a butt or closed end at one end of the tube.

My invention provides further the method consisting in first forming plastic material into a tube having a longitudinal seam or slot, then closing the seam or slot, then forming a butt or closed end at one end of the tube, and then lengthening the tube at its other end.

My invention further provides a novel method of forming a butt or closed end of a retort which will have great density and strength and which will be devoid of cracks or flaws.

With the employment of my improved method, it is possible to express the plastic material through the die or matrix with the use of a single movable plunger. As ordinarily made, retorts are formed between two movable plungers. By employing my improved method of forcing the plastic material around a stationary core in a die or matrix, and then closing the seam or seams formed by the supports for the core, the method may be practised with an apparatus employing but a single plunger.

The novel features of my invention are hereinafter fully described and claimed.

In the accompanying drawings, which illustrate an apparatus for carrying my improved method into effect, Figure 1 is an enlarged vertical sectional view of the apparatus.

Fig. 2 is a side elevation of the same, parts being broken away.

Fig. 3 is a vertical sectional view on the line 3—3 of Fig. 1.

Fig. 4 is an enlarged horizontal section on the line 4—4 of Fig. 3, some of the parts being removed.

Fig. 5 is an enlarged horizontal section on the line 5—5 of Fig. 3, some of the parts being removed.

Fig. 6 is an enlarged cross section on the line 6—6 of Fig. 4.

Fig. 7 is a horizontal cross section on the line 7—7 of Fig. 1.

Fig. 8 is an enlarged fragmental vertical sectional view of the mold or die counterbalancing mechanism and parts connected therewith.

Fig. 9 is a horizontal cross section on the line 9—9 of Fig. 1.

Fig. 10 is a horizontal cross section on the line 10—10 of Fig. 1.

Similar reference characters designate similar parts in the different views.

Figure 1:
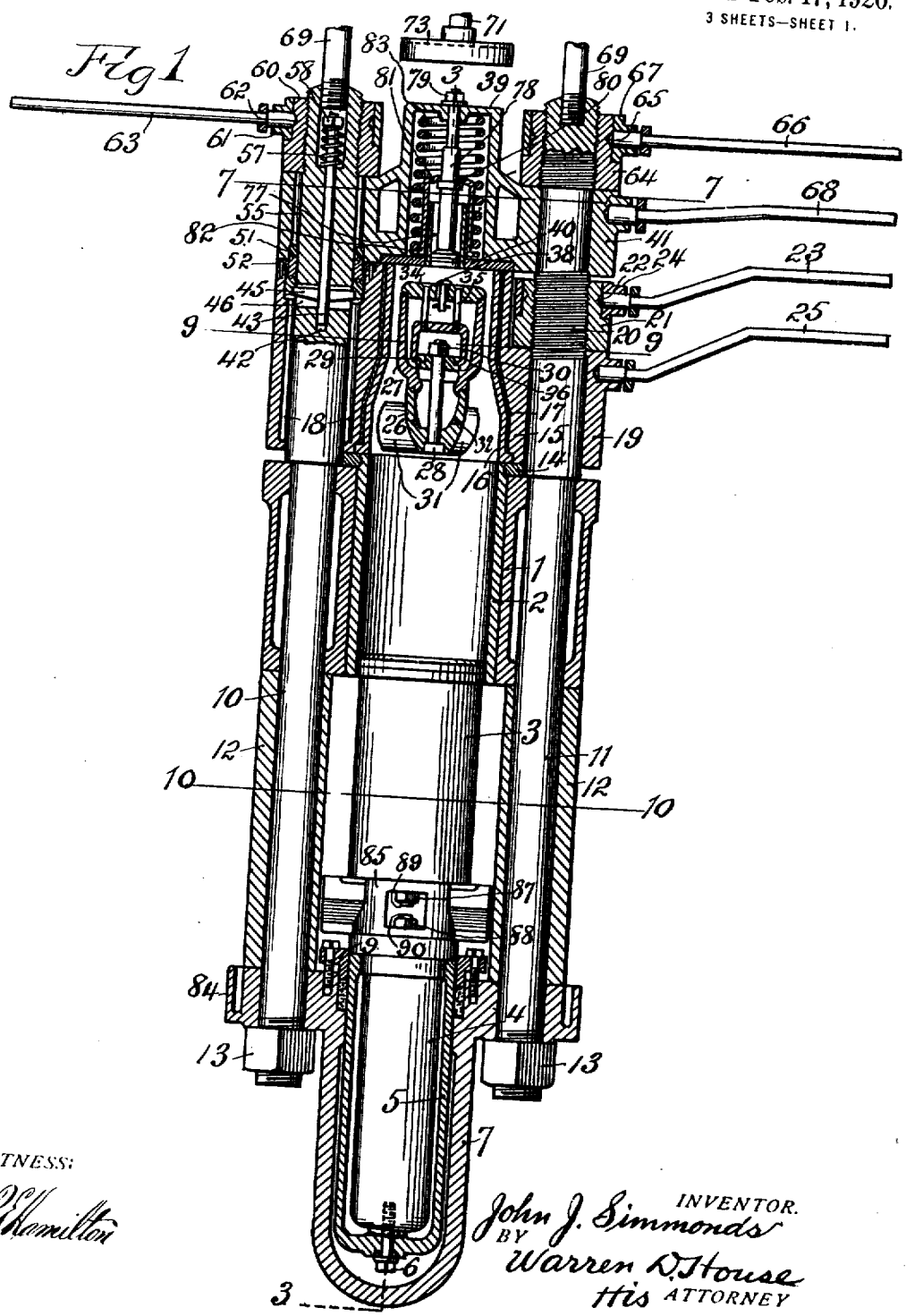

Referring particularly to Figs. 1 and 3, 1 designates a vertical cylinder provided with a tubular lining tube, in which is reciprocatively vertically slidable a piston 3 having a rod 4 which is mounted in a cup-shaped jacket 5 which is secured to the rod by means of a vertical bolt 6 which extends through the bottom of the jacket and is fitted in a vertical screw-threaded hole in the lower end of the rod 4.

The jacket 5 and rod 4 are vertically reciprocative in a vertical cylinder 7, which is closed at its lower end and which is provided with a lateral opening 8 for the entrance and exit of water, or other fluid, which is used for forcing the piston upwardly.

Encircling the jacket 5 and secured to the upper end of the cylinder 7 is a packing gland 9 of the ordinary type.

Extending vertically through two lateral peripheral diametrically opposite enlargements on the cylinder 1 are two posts 10 and 11 respectively. Each post 10 and 11 is provided with a shoulder which rests upon the top of the cylinder 1.

Two spacing collars 12 respectively encircle the posts 10 and 11, and have their upper ends bearing against the lower end of the cylinder 1. Their lower ends bear against the top of the cylinder 7.

Nuts 13 on the lower ends of the posts 10 and 11, bear against the under side of the cylinder 7, thereby firmly clamping together the cylinders 1 and 7 and the spacing collars 12.

An internally screw-threaded ring wear plate 14 is fitted to the externally screw-threaded shouldered upper end of the cylinder lining 2. Upon said lining and said ring wear plate rests the lower end of a vertical tubular matrix mold or die member 15, in which is provided a hardened tubular lining 16, between which and the member 15 is an annular lining of soft material 17, such as lead.

Through the member 15 is a vertical hole through which extends the post 10. In said hole are mounted vertical rollers 18, arranged in a circle around the post 10, and which furnish an anti-friction bearing for the member 15, upon which bearing said member may be easily swung to and from the operative position.

The opposite side of the matrix or die member 15 is provided with a hook 19, adapted, when said member is in the operative position, shown in Figs. 1 and 9, to embrace the post 11. The latter is provided above the hook 19 with screw threads 20, to which is fitted a nut 21, the periphery of which is provided with circularly arranged recesses 22, into any one of which is adapted to be inserted the inner conical end of a handle bar 23, which is horizontally slidable through a transverse hole provided in a collar 24, which is revoluble on the nut 21. By consecutively inserting the handle bar 23 into the recesses 22, and swinging the bar in the proper directions, the nut 21 may be tightened or loosened with respect to the matrix or die member 15 which the nut 21 is adapted to clamp against the wear plate 14.

Secured to the hook 10 is a horizontal bar 25 by which the mold or die member 15 may be swung.

The mold or die is provided with a stationary core, which has a hollow body comprising a downwardly tapering lower member 26 and an upper cylindrical member 27, which are clamped together by means of a vertical central bolt 28, which extends through the lower end of the member 26 and through a horizontal bridge plate 29, which rests upon the lower portion of the member 27. A nut 30 on the bolt 28 bears upon the upper side of the bridge plate 29.

The member 26 is provided with a plurality of lateral arms 31, which are, preferably, integral with the member 26 and with the lining 16. Air passages 32 extend respectively longitudinally through the arms 31, and through the lining 16, lining 17 and side wall of the mold or die member 15, and at their outer ends communicate with the atmosphere.

The periphery of the member 27 is concentric to the inner wall of the lining 16, from which it is spaced apart to permit the passage upwardly of the material which forms the retorts.

As shown in Figs. 4 and 6, the upper and lower edges of the arms 31 are wedge-shaped, and the upper edge 33 of each arm is disposed obliquely to the axis of the stationary core. The upper side walls of each arm 31 are, preferably, spirally disposed, so that the plastic retort forming material, at the edges of the seams formed by the arms 31, will, after passing the arms 31, overlap each other and be united as the plastic material passes into the narrow space above the arms 31, thereby closing the seams and forming tight joints.

The upper end of the core member 27 is normally closed by a cover 34, which fits in said member and rests upon the upper edge thereof, as shown in Figs. 1 and 3.

For holding the cover 34 closed, it has mounted in it two vertical bolts 35, the lower threaded ends of which are secured in an inverted U-shaped yoke 36, the lower ends of the arms of which are inwardly turned and are respectively mounted in two end grooves provided respectively in the ends of the plate 29, as shown in Fig. 1.

The cover 34 is provided with a central vertical air passage 37, which is normally closed by an upwardly opening check valve 38.

The mold or die is provided with a closure member 39 having fastened to its under side a circular horizontal wear plate 40 adapted to rest upon and cover the member 15 and the lining 16. The closure member 39 is provided at one side with a vertical hole through which extends the post 10. The opposite side of the member 39 is provided with a hook 41 adapted to embrace the post 11.

In order that the closure member 39 may be easily swung, it is provided with anti-friction bearing means, comprising the following described parts:—

Referring particularly to Fig. 8, 42 designates a central vertical hole provided in the upper end of the post 10, in which is slidably fitted a rod 43 having a transverse slot 44, in which is mounted a transverse bar 45, which is vertically movable in a slot 46, which is provided in the post 10.

Carried on the ends of the bar 45 is a horizontal ring 47, which is vertically slidable in the hole in the member 15 through which the post 10 extends.

In the upper side of the ring 47 is an annular ball race in which are mounted a series of balls 48, which are also mounted in an annular ball race which is provided in the lower side of a ring 49, which is slidable on the post 10 in the member 15, and the upper side of which is provided with a ball race in which is mounted a series of balls 50, which are also mounted in an annular ball race provided in the under side of a ring 51, which encircles the post 10 and which is slidably mounted in the closure member 39.

Encircling the ring 49 and secured to the upper side of the member 15 is a ring wear plate 52, which is secured to the member 15 by screws 53, and which serves as a stop for limiting the upward movement of the ring 49, which is provided with an annular shoulder 54 normally out of contact with the plate 52, as shown in Fig. 8.

An annular series of vertical rollers 55 encircles the post 10 within the closure member 39, and serves to take the lateral thrust of said closure member, when the latter is swung.

The hole 42, in the post 10, is provided with an enlargement 56 at the upper end thereof, and in said enlargement is provided a coil spring 57, which encircles the rod 43, and at its lower end has a bearing on the post 10, and at its upper end it has a bearing upon the under side of a nut 58, which is mounted upon the screw-threaded upper end of the rod 43.

Normally the spring 57 exerts a pressure tending to lift the closure 39 from the wear plate 52, through the intermediacy of the nut 58, rod 43, bar 45, rings 47, 49 and 51, the latter having a bearing at its upper side upon an annular shoulder 59 with which the closure member 39 is provided.

For holding the closure 39 tightly against the wear plate 50, and against the mold or die member 15, a nut 60 is mounted upon the screw-threaded upper end of the post 10. The nut 60 is adapted to bear against the upper side of the member 39.

For turning the nut 60, it has revolubly mounted on it a collar 61, which is provided with an annular series of recesses 62, preferably conical in form, each of which is adapted to receive the inner conical end of a horizontal handle bar 63, the inner end of which is adapted to be slidably inserted through a horizontal hole provided therefor in the collar 61.

As shown in Fig. 1, the upper end of the post 11 is screw-threaded and has fitted on it a nut 64 which is adapted to bear against the upper side of the hook 41. The nut 64 is provided with an annular series of conical recesses 65 which are adapted to receive the conical inner end of a horizontal handle bar 66, which is slidably insertible through a horizontal hole which is provided in a collar 67 revoluble upon the nut 64.

A horizontal handle bar 68 has its inner end secured in a horizontal hole, which is provided in the hook 41.

An inverted U-shaped frame has the lower ends of its arms 69 fitted in screw-threaded holes provided respectively in the upper ends of the posts 10 and 11. Slidably mounted on the arms 69 is a cross head 70 to which is secured a vertical bar 71, which is slidably mounted in the transverse portion 72 of said frame. Secured to the lower end of the bar 71 is a circular disk 73 which is adapted to bear against and steady the closed upper end of the retort as the latter is being forced through the die lining 16.

Secured to the upper end of the bar 71 is a rope 74 which passes over a pulley 75 suitably supported above the frame. The other end of the rope 75 is secured to and supports a counter-balance weight 76, see Fig. 2.

In order that the upper end of each retort shall be solid and without flaws, the following described mechanism is provided.

Referring to Figs. 1 and 3, 77 designates a vertical tube having its lower end externally threaded and fitted in a central threaded hole provided in the wear plate 40. Reciprocatively mounted in the tube 77 is a vertically slidable piston 78 which extends through and is slidable in the upper side of the hollow closure member 39, Fig. 1. Downward movement of the piston 78 is limited by a nut 79 which is mounted upon the screw-threaded upper end of the piston 78 and is adapted to bear upon the upper side of the member 39. The piston 78 is provided with a peripheral flange 80 which supports an inverted cup 81 through the top of which the piston 78 extends. The lower end of the cup 81 is provided with a peripheral flange 82 which supports the lower end of a coil spring 83, which encircles the piston 78 and the cup 81 and has its upper end bearing against the member 39. When the nut 79 rests on the member 39, the lower end of the piston 78 is flush with the lower side of the wear plate 40, as shown in Fig. 1.

The upper end of the cylinder 7 is provided with a horizontal rectangular extension 84, which is adapted to provide a base for supporting the apparatus.

The piston rod 4 is preferably connected with the piston head 3 by the following described mechanism.

Referring to Fig. 1, 85 designates an intermediate member provided with a transverse hole 86 and which has its upper and lower sides clamped to the lower end of the piston head 3 and the upper end of the rod 4 by means of nuts 87 and 88, which are mounted respectively upon downwardly extending bolts 89 in the lower end of the piston head 3 and upwardly extending bolts 90 provided in the upper end of the rod 4, suitable holes being provided through the upper and lower sides of the intermediate member 85 for such bolts.

In the operation of the apparatus, the nuts 21, 60 and 64 are loosened, thereby permitting the spring 57 to lift the closure member 39, as before described, until the shoulder 54 engages the ring plate 52. The spring 57 is sufficiently strong to cause the lifting also of the mold or die member 15, when the shoulder 54 strikes the plate 52. The weight of the members 39 and 15 being carried then by the spring 57, both members may be swung laterally to the open position, clear of the opening in the lining 2.

The piston head 3 being now in the lowermost position shown in Fig. 1, a quantity of plastic fire clay, or such other retort material as may be employed, sufficient to make a retort, is placed in the cylinder lining 2, after which the closure member 39 and mold or die member 15 are swung to the closed position, following which the nuts 21, 60 and 64 are screwed downwardly so as to tightly clamp the member 15 against the ring wear plate 14, and so as to clamp the closure member 39 tightly against the member 15.

Water is then admitted into the cylinder 7, under pressure, through the opening 8. The piston head 3 will thus be forced upwardly, thereby forcing the clay out of the cylinder lining 2 and into the matrix or die member lining 16, past the arms 31 and the member 27 and against the plate 40 and piston 78. The latter will be forced upwardly in the tube 77 against the pressure of the spring 83, after which the water pressure in the cylinder 7 is shut off, following which the spring 83 will force the piston 78 downwardly to the position shown in Fig. 1, thus forcing the clay which has entered the tube 77, back into the matrix or die lining 16, thus forming a solid compact butt or end for the retort, and which is without any cracks or other flaws.

The butt of the retort having been completed, steps are then taken to make the side walls of the retort. The nuts 60 and 64 are then loosened, thus permitting the spring 57 to lift the closure member 39 to a position in which the shoulder 54 will strike the plate 52. The closure member 39 may then be swung by means of the handle bar 68 to the open position. In the meantime, the matrix or die member 15 will be held clamped tightly against the ring plate 14, the nut 60 having been tightened after the closure member 39 has been swung to the fully open position.

Water under pressure is then again admitted through the opening 8 into the cylinder 7, thus causing the piston head 3 to force the remainder of the clay in the cylinder lining 2 into and through the matrix lining 16. During this operation, the plate 73 will rest against the closed end or butt of the retort to steady the upper end thereof during the formation of the side walls of the retort.

The plastic clay in passing through the lining 16, will pass the arms 31, and will be divided thereby and the edges will have imparted to them by the arms a spiral movement, following which the clay will be forced into the constricted space between the member 27 and the lining 16, and will thereby be forced to reunite at the edges of the seams or slots formed in the clay as it passes the arms 31. The oblique spiral disposition of the upper portions of the arms 31 will cause the plastic material to overlap and unite at the adjacent seam edges, so that the side walls of the retort, after passing the member 27, will be unbroken and flawless.

When the piston head 3 has reached the limit of its upward movement, the retort is cut off horizontally at the upper end of the matrix or die member 15. The nuts 60 and 21 are then loosened, thus permitting the spring 57 to lift the closure member 39 and the matrix or die member 15, as before described. The matrix or die member 15 can then be easily swung by the handle bar 25 to the open position, clear of the opening through the cylinder lining 2. The matrix or die member lining 16 at this time is full of the plastic clay which had been previously forced therein.

Previously to the last mentioned release of the nuts 21 and 60, the water pressure in the cylinder 7 was cut off. After the matrix or die member 15 had been swung to the open position, the water is allowed to escape from the cylinder 7, thus permitting the piston head 3 to descend to the lowermost position shown in Fig. 1. The cylinder lining 2 is then again supplied with clay sufficient to make the next retort, when added to the clay which is still retained, in the matrix or die member lining 16. After this has been done, the members 15 and 39 are again swung to the closed position and the nuts 21, 60 and 64 are tightened, so as to hold said members in the operative position. The piston head 3 is then forced upwardly, thereby forcing the clay from the cylinder lining 2 into the lining 16, and effecting the formation of the butt or closed end of the next retort now to be made. Following this, the next steps of the operation are taken in the manner which has already been described.

After the butt or closed end of a retort has been completed, and the side walls are being formed, air will be drawn by suction into the retort above the cover 34 through the air passages 32, the members 26 and 27 and the opening 37, the check-valve 38 being lifted by the incoming air.

By forcing the excess central projecting portion of the butt out of the tube 77 and back into the body of the butt, the central portion of the latter is increased in density and homogeneity, so that upon being dried and baked, it will not crack. I have found that, when the butts are made without having an excess of material, forced back into the body at the center thereof, the butt, upon the retort being dried and baked, will crack and have flaws, no matter under what pressure the retort material has been placed during the formation of the butt. By providing an excess of retort material at the central portion of the butt during the first step of the formation of the latter, and then forcing the excess material into the central portion of the butt, liability of cracks forming in the butt during the baking operation is avoided.

Modifications of my invention, within the scope of the appended claims, may be made without departing from the spirit of my invention.

What I claim is:—

1. The method of forming the butt or closed end of a retort, consisting in forming the butt from plastic retort material and then forcing an excess of retort material into the central portion thereof.

2. The method of forming the butt or closed end of a retort, consisting in forming the butt, from plastic retort material, with a central projecting portion, and then forcing the projecting portion into the body of the butt.

3. The method of forming the butt or closed end of a retort, consisting in forming a butt from plastic retort material by pressure so applied that the material will be forced toward the center of the butt, and then applying pressure to the central portion of the butt and in a direction such that the material will be increased in density at said central portion.

4. The method of forming the butt or closed end of a retort, consisting in first forming from plastic retort material a tube having a closed end or butt, and then forcing retort material into the central portion of the butt.

5. The method of forming the butt or closed end of a retort, consisting in first forming from plastic retort material a tube having a closed end or butt, the latter having a projecting portion, and then forcing the projecting portion into the body of the butt.

6. The method of forming the butt or closed end of a retort, consisting in first forming from plastic retort material a tube having a closed end or butt, and then increasing the density and homogeneity of the central portion of the butt.

In testimony whereof I have signed my name to this specification.

JOHN J. SIMMONDS.